(12) United States Patent
Kuhn et al.

(10) Patent No.: US 10,554,159 B2
(45) Date of Patent: Feb. 4, 2020

(54) MONITORING AND COMPENSATING THE ANGLE OF A ROTOR IN AN ELECTRIC MACHINE USING AN ANGLE SENSOR

(71) Applicant: Bayerische Motoren Werke Aktiengesellschaft, Munich (DE)

(72) Inventors: Marcel Kuhn, Kist (DE); Roman Nestlinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/115,073

(22) Filed: Aug. 28, 2018

(65) Prior Publication Data

US 2018/0367072 A1    Dec. 20, 2018

Related U.S. Application Data

(63) Continuation of application No. PCT/EP2017/053729, filed on Feb. 20, 2017.

(30) Foreign Application Priority Data

Feb. 29, 2016    (DE) .................... 10 2016 203 155

(51) Int. Cl.
  *H02P 6/18*    (2016.01)
  *H02P 21/18*    (2016.01)
(52) U.S. Cl.
  CPC .............. *H02P 6/183* (2013.01); *H02P 21/18* (2016.02); *H02P 2203/11* (2013.01)
(58) Field of Classification Search
  CPC ....... H02P 21/18; H02P 2203/11; H02P 6/183
  See application file for complete search history.

(56) References Cited

U.S. PATENT DOCUMENTS

| 2005/0110450 | A1 | 5/2005 | Stancu et al. |
| 2011/0304290 | A1* | 12/2011 | Ito .................. H02P 6/185 318/400.32 |
| 2012/0181962 | A1 | 7/2012 | Scheit et al. |

(Continued)

FOREIGN PATENT DOCUMENTS

| DE | 11 2004 002 293 T5 | 11/2006 |
| DE | 10 2008 060 840 A1 | 6/2010 |

(Continued)

OTHER PUBLICATIONS

International Search Report (PCT/ISA/210) issued in PCT Application No. PCT/EP2017/053729 dated May 19, 2017 with English translation (four (4) pages).

(Continued)

*Primary Examiner* — Muhammad S Islam
(74) *Attorney, Agent, or Firm* — Crowell & Moring LLP

(57) ABSTRACT

A method and a device are disclosed for monitoring and compensating an electric machine of an electrically driven vehicle. The method includes the following steps: determining a first value of a position of a rotor using an angle sensor when the rotor is in a first position; determining a second value of the position of the rotor using an injection method when the rotor is in the first position; determining a first difference between the first value and the second value of the position of the rotor at the first position of the rotor; and checking whether the first difference falls below a predetermined threshold.

11 Claims, 2 Drawing Sheets

(56) References Cited

U.S. PATENT DOCUMENTS

| | | | | |
|---|---|---|---|---|
| 2014/0246997 A1* | 9/2014 | Suzuki | ............... | H02P 6/16 |
| | | | | 318/400.02 |
| 2015/0057970 A1* | 2/2015 | Feuersaenger | .......... | H02P 27/04 |
| | | | | 702/151 |

FOREIGN PATENT DOCUMENTS

| | | |
|---|---|---|
| DE | 10 2009 045 247 A1 | 4/2011 |
| DE | 10 2010 016 105 A1 | 9/2011 |
| DE | 10 2010 053 098 A1 | 6/2012 |
| DE | 10 2012 204 147 A1 | 10/2012 |
| DE | 10 2012 017 794 A1 | 3/2013 |
| DE | 10 2012 111 799 A1 | 6/2013 |
| DE | 10 2012 102 898 A1 | 10/2013 |
| DE | 10 2014 014 933 A1 | 4/2015 |

OTHER PUBLICATIONS

German-language Written Opinion (PCT/ISA/237) issued in PCT Application No. PCT/EP2017/053729 dated May 19, 2017 (six (6) pages).

German-language Search Report issued in counterpart German Application No. 102016203155.4 dated Apr. 29, 2016 with partial English translation (eleven (11) pages).

* cited by examiner

MONITORING AND COMPENSATING THE ANGLE OF A ROTOR IN AN ELECTRIC MACHINE USING AN ANGLE SENSOR

CROSS REFERENCE TO RELATED APPLICATIONS

This application is a continuation of PCT International Application No. PCT/EP2017/053729, filed Feb. 20, 2017, which claims priority under 35 U.S.C. § 119 from German Patent Application No. 10 2016 203 155.4, filed Feb. 29, 2016, the entire disclosures of which are herein expressly incorporated by reference.

BACKGROUND AND SUMMARY OF THE INVENTION

The present invention relates to a monitoring and a compensation of the angle of the rotor in an electric machine with an angle sensor that determines the actual angle of the rotor.

An electric machine, in particular a synchronous machine, usually includes an angle sensor by which the position of the rotor with respect to the stator can be determined. The angle sensor transmits the present angle (actual angle) of the rotor to an inverter that provides alternating-current signals, for example three-phase current signals, to the windings of the stator depending on the present angle of the rotor. The efficiency of the electric machine can be increased through adjusting the three-phase current signals on the basis of the angle of the rotor with magnets. The way in which an electric machine operates is known to one of skill in the art, and need not have to be repeated in the interests of conciseness.

As a result of manufacturing tolerances, there is an angular offset between the position of the rotor measured by the angle sensor and the true position of the rotor. At present, the angular offset is determined by way of an expensive apparatus after the electric machine has been manufactured. The angular offset can be stored as a correction value, and taken into account in the output of the three-phase current signals. The angular offset can change during the service life of the electric machine. The angular offset, once determined, can be deleted as a result of software problems or an incorrect operation during service. The mounting of the angle sensor can change as a result of vibration, temperature or aging effects. It can, moreover, be necessary to exchange the angle sensor in a dispatched vehicle.

DE 10 2012 017 794 A1 discloses a drive with a synchronous machine in which an angle sensor is not used and the position of the rotor is determined by means of an injection device.

DE 10 2010 016 105 A1 discloses a pitch-drive apparatus capable of emergency operation for a wind turbine or hydroelectric power plant with a synchronous motor that comprises an angle sensor. In an emergency operation, the speed of rotation of the motor can be determined on the basis of measured injection currents.

In an electric machine for the drive of a motor vehicle, the efficiency is reduced and a torque with a lower precision is output if the offset of the angle sensor from the true position of the rotor is not corrected. To increase the efficiency of the electric machine, it is necessary to compensate the angle of the rotor with the angle sensor with the greatest long-term stability possible.

The invention addresses the object of providing a method and an apparatus for determining the offset of an angle sensor with respect to the rotor of an electric machine.

The object of the invention is achieved by a method and apparatus in accordance with embodiments of the invention.

The method according to the invention for monitoring an electric machine of an electrically driven vehicle comprises the step of determining a first value of a position of a rotor by way of an angle sensor when the rotor is located in a first position, and determining a second value of the position of the rotor by way of an injection method when the rotor is located in the first position. The method further comprises the step of determining a first difference between the first value and the second value of the position of the rotor for the first position of the rotor. According to the invention, a check is made as to whether the first difference falls below a predetermined threshold value.

The angle sensor can be used to determine the position of the rotor during the operation of the electric machine. The present angular position of the rotor can in this way be determined in a simple manner. The injection method can be used to determine the offset between the true angular position of the rotor and the angular position of the rotor determined by the angle sensor. It is obvious that this offset can be taken into account in the controller, for example in the case of an inverter, to generate three-phase current signals that take the true angular position of the rotor better into account, in order to produce a higher efficiency and a torque with a higher precision.

The injection method essentially injects a signal into the d-axis and measures the current response in the q-axis. The injection method is known to those of skill in the art, and therefore for the sake of conciseness does not have to be described in more detail here. An exemplary implementation of the injection method is described in DE 10 2012 017 794 A1.

If the first difference falls below a predetermined threshold value, the electric machine is classified as fit for operation. The first difference can be the angular offset. The method classifies the electric machine as suitable for installation into a vehicle if the first difference falls below the predetermined threshold value.

The present invention can be employed both after the manufacture of the electric machine as well as during ongoing operation of the electric machine. The present invention has the advantage that the offset between the value of the rotary position of the rotor determined by the angle sensor and the true rotary position of the rotor can be determined simply and quickly, and without additional test devices.

In a further embodiment, the method further comprises the step of turning the rotor from the first position through a predetermined angle into a second position. The rotor can be turned by means of currents that flow from the inverter into the windings of the electric machine. The method determines a first value of the position of the rotor by way of the angle sensor when the rotor is located in the second position. The method further determines a second value of the position of the rotor by way of the injection method when the rotor is located in the second position. The method further determines a second difference between the first value and the second value of the position of the rotor at the second position of the rotor. The first value and at least one second value can be linked by statistical methods in order to eliminate inaccuracies of measurement, for example inaccuracies of measurement resulting from harmonics.

In one form of embodiment of the method, a mean value is formed from the first and the at least one second difference. A check is further made as to whether the mean value of the first and the second difference falls below the predetermined threshold value. Measurement errors, resulting for example from harmonics that are present in the response signal that is generated by the injection method, can be eliminated through the formation of a mean value. Harmonics in the measurement result of the injection method can be eliminated through this step.

The method can compensate the harmonics of the response to a signal that is applied through the injection method to the windings of the electric machine. The predetermined angle through which the rotor is turned from the first position into the second position can be specified in such a way that it corresponds to half the period duration of a harmonic. Preferably, the predetermined angle corresponds to half the period duration of the harmonic with the greatest amplitude.

The predetermined angle $\varphi$ can be determined by means of the following formula:

$$\varphi = 360°/(n \times 2);$$

where n indicates the n-th harmonic, and where n is a natural number.

The harmonic identified with n can be the harmonic with the greatest amplitude.

The method can carry out the step of the determination of the first value of the position of the rotor by way of the angle sensor at a first position of the rotor at the beginning and/or during a journey of the vehicle, and can carry out the step of the determination of the second value of the position of the rotor at the first position of the rotor by way of the injection method. The method can carry out the step of determination of the first difference between the first value and the second value of the position of the rotor at the first position of the rotor at the beginning and/or during the journey of the vehicle. The method can then carry out the step of checking whether the first difference falls below a predetermined threshold value at the beginning and/or during a journey of the vehicle. The method can further carry out the step of storing the first difference in a difference memory in which a plurality of values of the first difference are stored at the beginning and/or during a journey of the vehicle. Through this the method can continuously monitor and adjust the offset between the rotary position of the rotor acquired by the angle sensor and the rotary position of the rotor determined by the injection method. It is assumed in the present invention that the true angle of the rotor can be verified by means of the injection method, since mechanical tolerances between the rotor and the angle sensor have no influence on the result of the measurement by means of the injection method. As a result, the angular offset between the position of the rotor measured with the sensor and the true position of the rotor can be compensated.

The method can average the values of the first differences that are stored in the first difference memory in order to obtain a mean value of the first difference. The method can provide a correction value for correcting the first value of the position of the rotor determined by the angle sensor on the basis of the mean value of the first difference. The correction value can be added to or subtracted from the first values determined by the angle sensor.

The method can check whether proper angle signals are present from all the angle sensors of a redundant angle sensor system. The redundant angle sensors can, for example, comprise a GMR sensor (giant magnetoresistive sensor) and/or an AMR sensor (anisotropic magnetoresistive sensor). If it is determined that only one proper angle signal is present from an angle sensor of the redundant angle sensor system, the method determines whether the first difference between the first value determined by the angle sensor with the proper angle signal and the second value determined by way of the injection method falls below a predetermined value. It follows that the first value determined by the angle sensor with the proper angle signal is located in a tolerance range around the second value determined by the injection method. If it is determined that the first difference falls below a predetermined value, the method can permit an emergency operation of the electric machine. To control the electric machine it follows that only the values of whichever angle sensor of the redundant angle sensors that essentially correspond to the true rotary position of the rotor are used. The values of the respective other angle sensor of the redundant angle sensors are not considered further. The availability of the electric machine can be increased in this way. The method can determine which of the angle sensors of the redundant angle sensor system is providing a proper angle signal.

The invention also relates to a monitoring device that is designed to monitor the operation of an electric machine. The monitoring device includes a determination device that is designed to determine a first value of a position of a rotor by way of an angle sensor at a first position of the rotor, to determine a second value of the position of the rotor by way of an injection method at the first position of the rotor, and to determine a first difference between the first value and the second value of the position of the rotor at the first position of the rotor. The monitoring device further includes a checking device that is designed to check whether the first difference falls below a predetermined threshold value.

The monitoring device can be developed in the way that was previously described in respect of the method.

The invention also relates to an electric drive with an electric machine and the monitoring device. The invention also relates to a vehicle with the electric drive.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
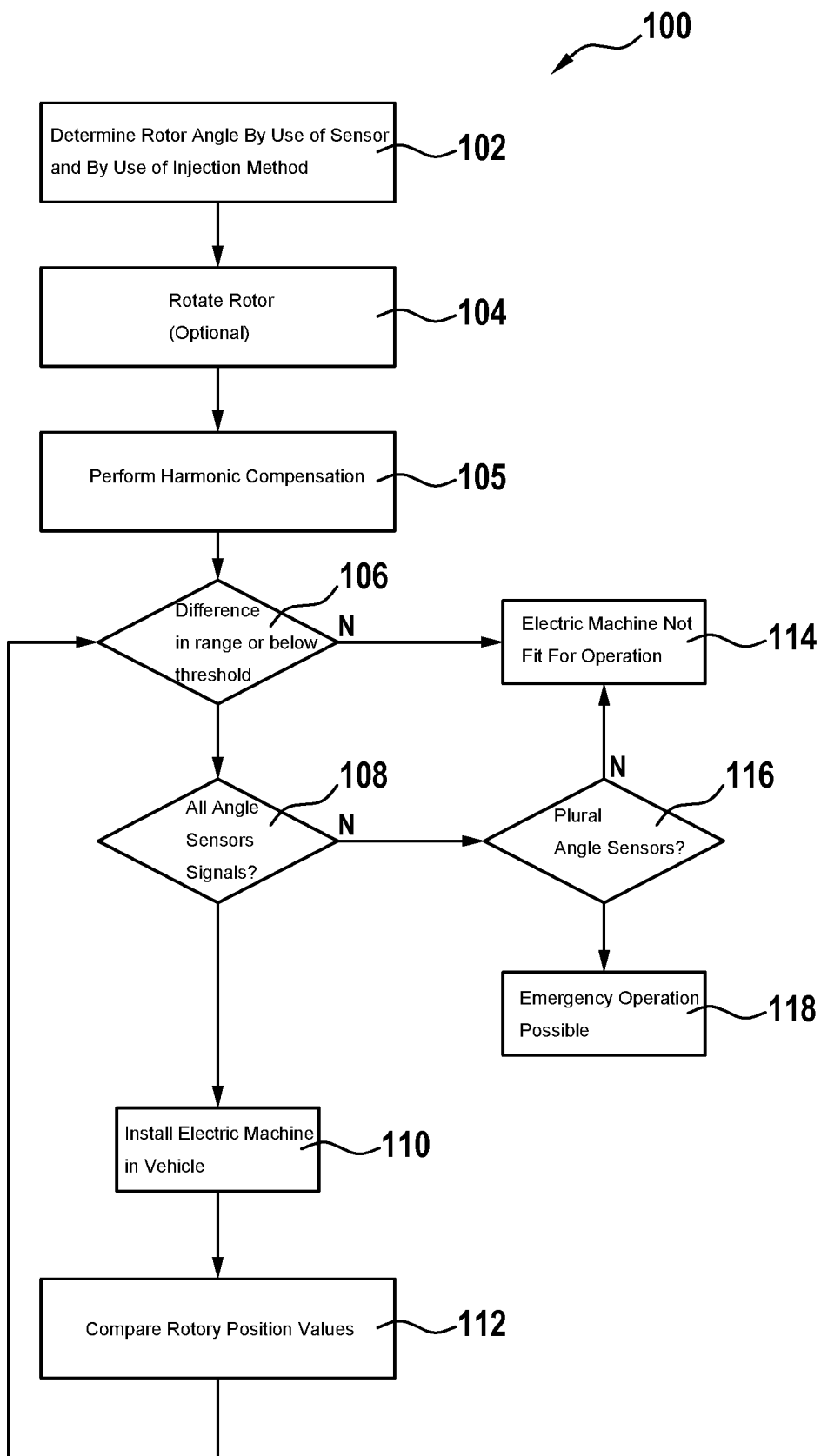
FIG. 1 is a flow diagram of the method according to an embodiment of the invention.

The steps of the method 100 according to an embodiment of the invention are described in more detail with reference to FIG. 1. After the manufacture of the electric machine, a determination of the rotor angle by use of a sensor fitted into the electric machine and by use of an injection method takes place in step 102. As was explained before, an HF signal is injected into the electric machine in the d-axis in the injection method. The current response is, further, recorded in the q-axis. The value of the rotary position of the rotor determined using the injection method can be compared and/or compensated with the value of the position of the rotor determined by the angle sensor. On the one hand it can be ensured in this way that the angle sensor has been mounted in the electric machine such that the angle value determined is located within a predetermined tolerance range. Manufacturing tolerances can, furthermore, be compensated, whereby the efficiency of the electric machine can be increased.

The rotor of the electric machine can be rotated at least once in the optional step 104. Preferably the rotor is turned through an angle value φ which is determined by means of the following formula:

$$\varphi = 360/(n \times 2);$$

where n is a natural number and n indicates the harmonic with the greatest amplitude.

As a result it is possible to carry out a harmonic compensation in step 105, for example in that a plurality of values that have been determined using the angle sensor and the injection method are processed statistically. In one form of embodiment, the mean value can be determined from the difference values of the pairs of values that have been determined by use of the angle sensor and the injection method. There are, in general, two possibilities for compensating the harmonics: If the harmonic is known, the electric machine can be turned in a defined manner. In this case the electric machine only has to be turned through the angle φ and a mean value formed from two measurements. The second possibility is to determine the angular offset or the second difference during running time at various, non-defined rotor positions of the electric machine. With the assumption that the mean value corresponds to the exact value, a mean value of the first difference and a plurality of second differences can approximate to the true value.

Whether the difference between the value of the rotary position that was determined using the injection method and the value of the rotary position that was determined using the angle sensor is located within a predetermined tolerance range, or is smaller than a predetermined threshold value, is checked in step 106.

If the difference is located within a predetermined tolerance range, a check is made in step 108 as to whether all the signals of the angle sensors are present.

If all the signals of the angle sensors are present, it is established in step 110 that the electric machine can be fitted into a vehicle. The value of the rotary position of the rotor acquired by way of the angle sensor can, furthermore, be corrected by means of the value of the rotary position of the rotor determined with the injection method.

After the electric machine has been installed in the vehicle, the value of the rotary position of the rotor determined by use of the angle sensor can be compared with the value of the rotary position of the rotor determined by use of the injection method at the beginning of a drive cycle or at an arbitrary other point in time of the drive cycle in step 112. Errors that may occur can, further, be compensated, for example in that the value of the rotary position of the rotor determined using the angle sensor is corrected by the difference between the values determined using the injection method and by use of the angle sensor.

The method then returns again to steps 106 and 108, wherein a check is made as to whether the difference between the value determined by way of the angle sensor and the value of the rotary position of the rotor determined by way of the injection method is located within the tolerance range, and a check is made as to whether all angle signals are present.

If the difference between the two angle values determined is located within the tolerance range, and if all the angle signals are present, the system returns to step 110 wherein it is established that the electric machine is functionally capable and approval is given for the drive cycle. It is furthermore possible to determine a compensation value for the value of the rotary position that is determined by means of the angle sensor in step 110. The compensation value can, for example, be determined by means of a mean value of a plurality of differences of the pairs of angle values, wherein each pair of angle values comprises the value of the rotary position of the rotor that was determined by use of the injection method and comprises the value of the rotary position of the rotor that was determined by use of the angle sensor at the same point in time and/or the same rotary position of the rotor. It is possible in this way to compensate harmonics and to reduce the influence of measurement errors.

If it is determined in step 106 that the difference between the value that was determined using the injection method and the value that was determined using the angle sensor is located outside the tolerance range or exceeds a predetermined threshold value, the method establishes that the electric machine is not fit for operation, and enters state 114, in which it is indicated that the electric machine is not fit for operation.

If it is established in step 108 that not all the angle signals are present, a check is made as to whether the angle sensor comprises a plurality of redundant angle sensors, for example a combination of a GMR sensor and an AMR sensor, as was described previously. If it is established in step 116 that the angle sensor does not comprise any redundant angle sensors, or that none of the redundant sensors is generating an angle signal, the method moves on to step 114 in which it is indicated that the electric machine is not fit for operation.

If it is established in step 116 that at least one angle sensor of the redundant angle sensors is generating an angle signal, the method moves on to step 118 in which it is indicated that an emergency operation with the electric machine is possible.

Figure 2:
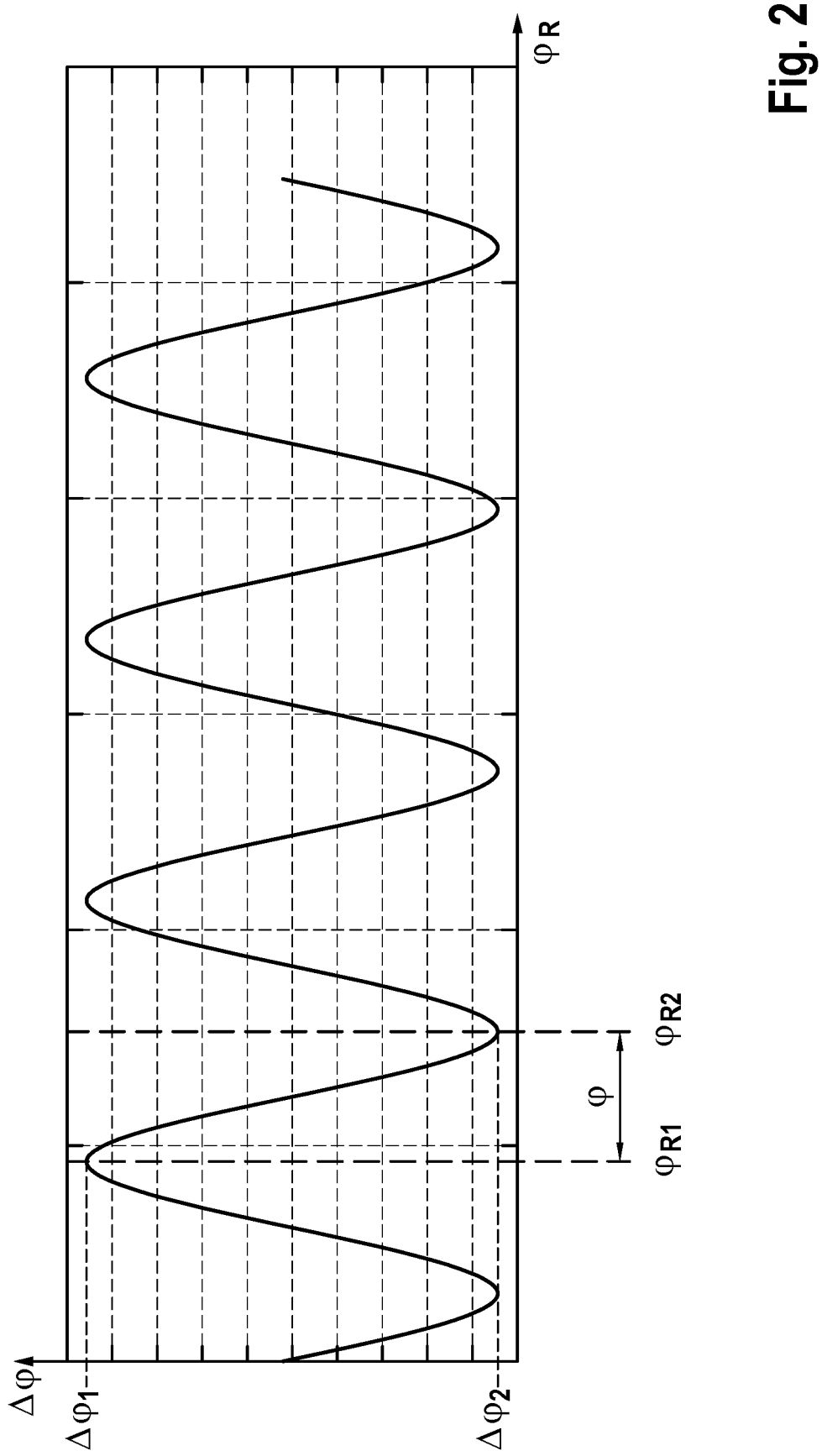
FIG. 2 shows a harmonic compensation.

Reference is made to FIG. 2 which shows an exemplary method for compensating harmonics in the injection method. The rotor angle $\varphi_R$ is plotted on the abscissa. The measurement error in the injection method resulting from harmonics is shown on the ordinate.

The method according to the invention determines a first value of the angle of the rotor in the first rotary position $\varphi_{R1}$ of the rotor by use of the injection method. A value, including measurement errors resulting from harmonics, with a magnitude of $\varphi_{I1}$ is measured here in the first rotary position of the rotor. The rotor is then turned through the angle φ into the second rotary position $\varphi_{R2}$.

The method then determines, by use of the injection method at the rotary angle of the rotor $\varphi_{R2}$, a second value of the angle of the rotor for the second rotary position of the rotor by use of the injection method. A value, including measurement errors resulting from harmonics, with a magnitude of $\varphi_{I2}$ is measured for the second rotary position of the rotor. The difference between the angles $\varphi_{R1}$ and $\varphi_{R2}$, which are acquired by the angle sensor, preferably amounts to φ, where φ is selected as follows:

$$\varphi = 360°/(n \times 2);$$

where n indicates the n-th harmonic, and where n is a natural number.

The first difference $\Delta\varphi_1$ is calculated from the two measured values $\varphi_{I1}$ and $\varphi_{R1}$, and constitutes a first value for the offset of the angle sensor to the rotor position. The second difference $\Delta\varphi_2$ is calculated from the two measured values $\varphi_{I2}$ and $\varphi_{R2}$, and constitutes a second value for the offset of the angle sensor with respect to the rotor position. The offset of the angle sensor with respect to the rotor position can be determined more precisely through forming the mean value of the first difference and the second difference.

The present invention has, on the one hand, the advantage, that after the manufacture of the electric machine, it is possible to check the precision of the angle sensor practically without external test equipment. The precision of the angle sensor can, furthermore, be monitored during operation.

It is on the one hand thereby possible to reduce the manufacturing costs and the time required for manufacturing the electric machine. On the other hand it is possible to improve the efficiency of the electric machine as a result of the improved precision in the determination of the actual angle of the rotor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring an electric machine of an electrically driven vehicle, the method comprising the steps of:
    determining a first value of a position of a rotor using an angle sensor when the rotor is located in a first position;
    determining a second value of the position of the rotor using an injection method when the rotor is located in the first position;
    determining a first difference between the first value and the second value of the position of the rotor at the first position of the rotor; and
    checking whether the first difference falls below a predetermined threshold value.

2. The method as claimed in claim 1, wherein the electric machine is classified as fit for operation and/or suitable for installation into a vehicle if the first difference falls below the predetermined threshold value.

3. The method as claimed in claim 1, further comprising the steps of:
    turning the rotor through a predetermined angle into a second position;
    determining a first value of a position of the rotor using the angle sensor when the rotor is located in the second position;
    determining a second value of the position of the rotor using the injection method when the rotor is located in the second position; and
    determining a second difference between the first value and the second value of the position of the rotor at the second position of the rotor.

4. The method as claimed in claim 3, further comprising the steps of:
    forming a mean value of the first and the second differences; and
    checking whether the mean value of the first and the second difference falls below a predetermined threshold value.

5. The method as claimed in claim 4, further comprising the steps of:
    determining the harmonics of the response to a signal that is applied through the injection method to the windings of the electric machine; and
    specifying the predetermined angle in such a way that it corresponds to half the period duration of a harmonic.

6. The method as claimed in claim 5, wherein the predetermined angle $\varphi$ is determined as follows:

$$\varphi = 360°/(n*2);$$

where n indicates the n-th harmonic, and where n is a natural number.

7. The method as claimed in claim 3, further comprising the steps of:
    determining the harmonics of the response to a signal that is applied through the injection method to the windings of the electric machine; and
    specifying the predetermined angle in such a way that it corresponds to half the period duration of a harmonic.

8. The method as claimed in claim 1, wherein at a beginning and/or during a journey of the vehicle, the method carries out the steps of:
    determining the first value of a position of the rotor using an angle sensor when the rotor is located in the first position;
    determining the second value of the position of the rotor using an injection method when the rotor is located in the first position;
    determining the first difference between the first value and the second value of the position of the rotor at the first position of the rotor;
    checking whether the first difference falls below a predetermined threshold value; and
    storing the first difference in a difference memory in which a plurality of values of the first difference are stored.

9. The method as claimed in claim 8, further comprising the steps of:
    averaging the values of the first difference that are stored in the first difference memory in order to obtain a mean value of the difference; and
    providing a correction value for correcting the first value of the position of the rotor determined by the angle sensor on the basis of the mean value of the first difference.

10. The method as claimed in claim 8, further comprising the steps of:
    checking whether proper angle signals are present from all the angle sensors of a redundant angle sensor system;
    if it is determined that only one proper angle signal is present from an angle sensor of the redundant angle sensor system, checking whether the first difference between the first value determined by the angle sensor with the proper angle signal and the second value determined by means of the injection method falls below a predetermined value;
    if it is determined that the first difference falls below a predetermined value, permitting an emergency operation of the electric machine.

11. A monitoring device designed to monitor operation of an electric machine, comprising:
    a determination device operatively configured to:
    determine a first value of a position of a rotor using an angle sensor at a first position of the rotor;
    determine a second value of the position of the rotor using an injection method at the first position of the rotor;
    determine a first difference between the first value and the second value of the position of the rotor at the first position of the rotor; and a checking device operatively configured to check whether the first difference falls below a predetermined threshold value.

\* \* \* \* \*